March 23, 1965

P. H. JOHNSON 3,175,015

METHOD OF CONTROLLING EXOTHERMIC REACTIONS
AND APPARATUS THEREFOR

Filed May 31, 1962

INVENTOR.
P. H. JOHNSON

BY Young & Quigg

ATTORNEYS

United States Patent Office 3,175,015
Patented Mar. 23, 1965

3,175,015
METHOD OF CONTROLLING EXOTHERMIC
REACTIONS AND APPARATUS THEREFOR
Paul H. Johnson, Bartlesville, Okla., assignor to Phillips
Petroleum Company, a corporation of Delaware
Filed May 31, 1962, Ser. No. 198,994
4 Claims. (Cl. 260—667)

This invention relates to an improved method of and apparatus for controlling an exothermic reaction. In another aspect, this invention relates to an improved method of and apparatus for controlling an exothermic catalytic reaction wherein the temperature of a catalyst bed is controlled.

Temperature control of exothermic reactions is obviously highly important to the effectiveness of the exothermic reaction. A conventional method of controlling the temperature of an exothermic reaction zone comprises measuring the temperature at a fixed point or position within the reaction zone and manipulating the rate of flow of a cooling medium in indirect heat exchange with the reaction zone responsive thereto. Such a control system assumes that a temperature measurement at the fixed point is always representative of the significant reaction zone temperature. Prior art methods of control are inadequate wherein the location of the significant reaction zone temperature changes as the reaction progresses.

In an exothermic catalytic reaction wherein a vaporous benzene feed is passed to a hydrogenation zone containing a fixed catalyst bed, the location of the significant or maximum temperature within the catalyst bed moves from the inlet to the outlet of the catalyst bed as the activity of the catalyst decreases. The catalyst bed zone having the maximum temperature is the zone wherein the catalytic reaction is effected. Therefore, it is desirable that an exothermic reaction temperature control system be based upon determining the location of the maximum or significant reaction zone temperature.

A conventional method of controlling the temperature of a catalytic exothermic reaction comprises preparing a fixed catalyst bed in a vertical reactor tube and passing a reactant feed through the reactor tube in indirect heat exchange with a cooling medium outside of and adjacent to the reactor tube. The catalytic reaction substantially takes place in a narrow zone within the catalyst bed, and as the activity of the catalyst is reduced, the reaction zone moves from the inlet to the outlet of the catalyst bed. The temperature of the reactant feed increases until the reaction temperature is attained and then proceeds to decrease as the effluent passes through the remainder of the catalyst bed and from the catalyst bed.

Assume that the reactant feed is to the top of the catalyst bed and that the effluent passes from the bottom of the catalyst bed. Further assume that the temperature of the catalyst bed is controlled by the conventional method of surrounding the reactor tube with a cooling medium. It is generally desirable that the feed to an exothermic reaction employing a fixed catalyst bed be preheated, thereby obtaining the reaction temperature quickly in the presence of the catalyst which results in a desirably high reaction rate. As the reaction zone moves from the inlet to the outlet of the catalyst bed, the cooling medium will also cool the preheated reactant feed before the reactant feed passes into the reaction zone. Obviously, this substantially reduces the efficiency of the exothermic reaction.

I have discovered an improved method of and apparatus for controlling the temperature of an exothermic reaction employing a fixed catalyst bed wherein the location of the significant reaction temperature is determined and the temperature of the fixed catalyst bed controlled responsive thereto.

Accordingly, an object of my invention is to provide an improved method of and apparatus for controlling the temperature of a fixed catalyst bed.

Another object of my invention is to provide an improved method of and apparatus for controlling the temperature of an exothermic catalytic reaction.

Other objects, advantages, and features of my invention will be readily apparent to those skilled in the art from the following description and appended claims.

The inventive control system is applicable to the temperature control of a solid fixed catalyst bed employed in an exothermic reaction. The term "reaction zone" as hereinafter employed refers to that region of the catalyst bed having a temperature indicating that the exothermic reaction is substantially effected within said region.

Figure 1:
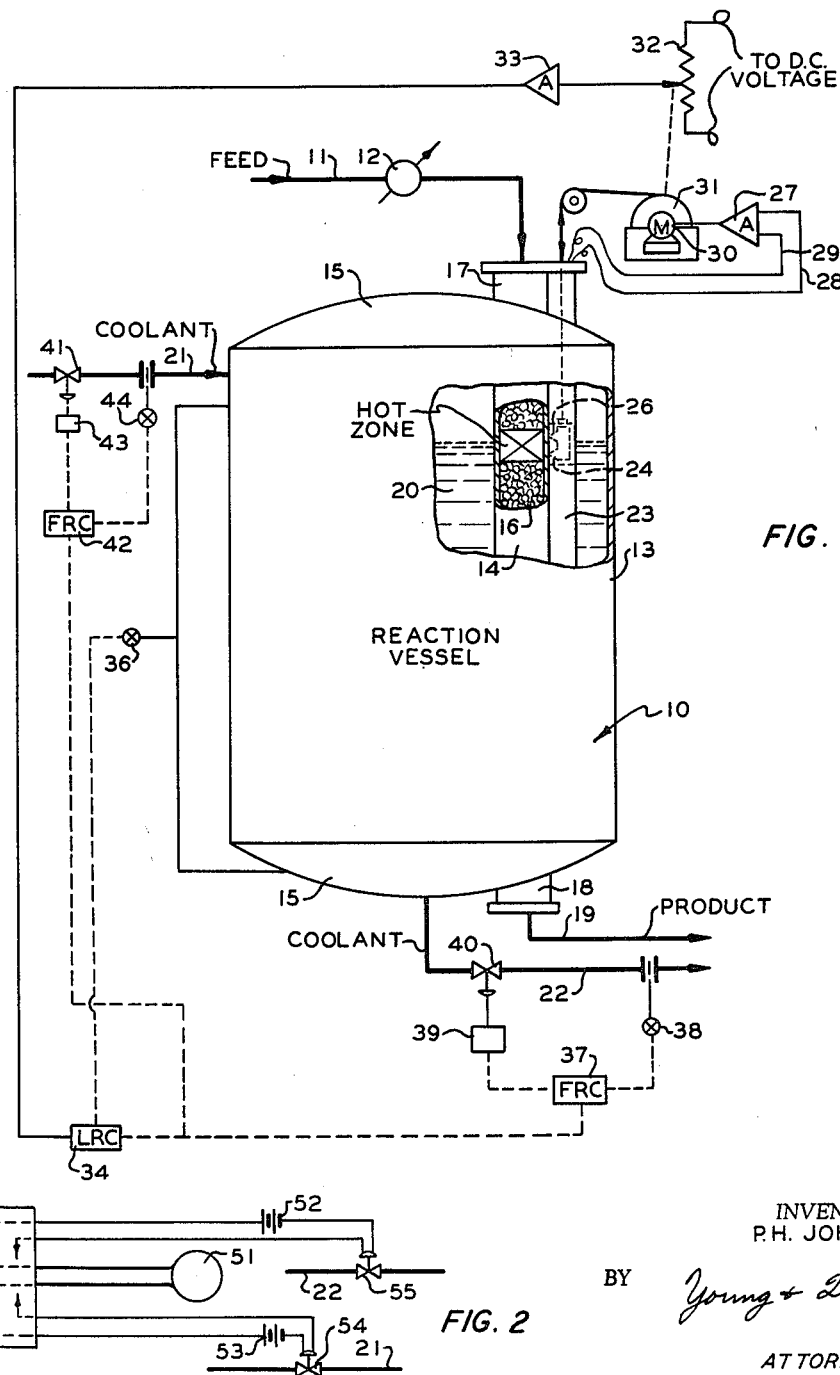
FIGURE 1 is a schematic representation of one embodiment of the inventive control system.

Referring to FIGURE 1, a reactant feed is passed via conduit means 11 to reaction vessel 10. The reactant feed is preheated by a conventional heat exchange means 12. Reaction vessel 10 comprises a vertical shell member 13 with upper and lower closure members 15, and containing at least one vertical reactor tube or chamber 14. Vertical reactor tube 14 contains a solid catalyst bed 16 having a "hot zone" or reaction zone.

The preheated reactant feed passes into reaction vessel 10 via inlet means 17 and is passed downwardly through catalyst bed 16. Upon entering the vertical reactor tube 14 containing catalyst 16, the reactant feed undergoes an exothermic reaction. Reaction zone effluent is withdrawn from reaction vessel 10 via outlet means 18 and conduit means 19. A coolant 20 is passed to reaction vessel 10 via conduit inlet means 21 and is withdrawn from reaction vessel 10 via conduit outlet means 22. Within reaction vessel 10, coolant 20 is maintained in indirect heat relationship with the reactant feed flowing downwardly through the vertical reactor tube 14.

Having described the process flow, an embodiment of the inventive control system will now be described. Referring to FIGURE 1, a vertical conduit 23 is positioned so that a portion of the exterior surface of reactor tube 14 forms a portion of the inner surface of conduit 23. A thermocouple having two junctions 24, 26 (hot-cold) is positioned within vertical conduit 23 in such a manner that it can be moved upwardly or downwardly through conduit 23 in constant contact with the exterior surface of tube 14. A signal representative of a temperature differential existing between the wall temperatures of reactor tube 14 at the positions in communication with junctions 24 and 26 is transmitted to a conventional amplifier 27 by means of lead wires 28 and 29. The wall temperatures as measured by junctions 24 and 26 are representative of temperatures within the catalyst bed. Responsive to the thermocouple signal, amplifier 27 will transmit a signal to a balancing motor 30. Motor 30 operates a conventional pulley system 31 to raise or lower the thermocouple responsive to the direction of the signal received from the thermocouple.

For example, assume that the direction of the signal received from the thermocouple indicates that junction 26 is the cold junction and that junction 24 is the hot junction. Thus, the reaction or hot zone is below the zone presently bracketed by junctions 26 and 24. Amplifier 27 transmits a signal to balancing motor 30 which causes the junction points 26 and 24 to be lowered until junctions 26 and 24 are within the hot or reaction zone.

Junctions 26 and 24 must be spaced sufficiently apart so that their respective temperature measurements are significant. If the signal transmitted by the thermocouple indicates that junction 24 is the cold junction and junction 26 is the hot junction, then amplifier 27 will transmit a signal to motor 30 which will result in motor 30 causing the pulley system to raise the thermocouple until junctions 24 and 26 are within the hot or reaction zone. As previously noted, the reaction zone will move from the inlet to the outlet of the catalyst bed as the catalyst activity decreases. A suitable amplifier and balancing motor that can be employed is the Honeywell Electronic Amplifier and Balancing Motor described in Catalog C15-2.

A D.C. voltage is transmitted to a variable resistance 32 from a source not herein illustrated, said variable resistance 32 manipulated responsive to the position of the thermocouple. Thus, a D.C. voltage signal representative of the position of the thermocouple within vertical conduit 23 is transmitted to a conventional amplifier 33 such as manufactured by Electronic Associates and described in their bulletin No. AC-6192. Amplifier 33 transmits a D.C. signal as a reset signal to a conventional liquid level-recorder-controller 34 representative of the position of the thermocouple within vertical conduit 23. The liquid level within reaction vessel 10 is sensed and a signal representative of said liquid level is transmitted by a conventional differential/pressure transmitter 36 to liquid level-recorder-controlled 34.

The two input signals received by liquid level-recorder-controller 34 are compared in the conventional manner and a reset signal responsive thereto transmitted to a conventional flow-recorder-controller 37. The rate of coolant flow through conduit means 22 is sensed and a signal representative of said rate of flow measurement transmitted by a conventional differential/pressure transmitter 38 to flow-recorder-controller 37. The two input signals received by flow-recorder-controller 37 are compared in the conventional manner and a signal responsive thereto transmitted to a conventional E.M.F.-to-pneumatic transducer 39 and from E.M.F.-to-pneumatic transducer 39 to a control valve 40.

Liquid level-recorder-controller 34 also transmits the reset signal to a conventional flow-recorder-controller 42. The rate of coolant flow through conduit means 21 is sensed and a signal representative of said rate of flow measurement transmitted by a conventional differential/pressure transmitter 44 to flow-recorder-controller 42. The two input signals received by flow-recorder-controller 42 are compared in the conventional manner and a signal responsive thereto transmitted to a conventional E.M.F.-to-pneumatic transducer 43 and from E.M.F.-to-pneumatic transducer 43 to a control valve 41.

Control valve 40 and control valve 41 are opened or closed responsive to the signal received from liquid level-recorder-controller 34, thereby manipulating the liquid level so as to maintain the level of liquid 20 within reaction vessel 10 substantially at or within the reaction zone. The temperature of the cooling medium passed via conduit means 21 to reaction vessel 10 can be controlled by conventional means such as a U-tube heat exchanger. The inventive control system thus provides a method of and apparatus for controlling the temperature of the fixed catalyst bed to include the reaction zone, withdrawing the exothermic heat of reaction from a moving reaction zone without cooling the preheated reactant feed.

Figure 2:
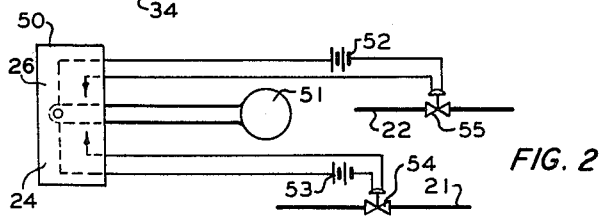
FIGURE 2 is a schematic representation of a second embodiment of the inventive control system.

A second embodiment of the inventive control system is illustrated by FIGURE 2. A block 50 containing spaced junctions 26 and 24 is maintained immediately adjacent to reactor tube 14. Block 50 is moved upwardly and downwardly along reactor tube 14 by a conventional means. A conventional float 51 is attached directly to block 50. Float 51 senses the liquid level 20 within reaction vessel 10 and if the liquid level is above the thermocouple junctions, acts to complete the circuit so as to transmit a signal from a battery source 52 to a conventional solenoid valve 55. Solenoid valve 55 is thereby opened permitting the withdrawal of coolant from reaction vessel 10 via conduit means 22. If the liquid level 20 within reaction vessel 10 is below the reaction zone as sensed by thermocouple junctions 26 and 24, the circuit containing battery source 53 is closed and a signal transmitted to a conventional solenoid valve 54, thereby passing coolant via conduit means 21 to reaction vessel 10 by causing valve 54 to be opened. The thermocouple junctions 24 and 26 are positioned along reactor tube 14 in the previously described manner.

The inventive method of control and apparatus is applicable to the control of a highly exothermic reaction such as the hydrogenation of benzene employing a catalyst such as nickel. In the hydrogenation of benzene, water can be employed as the cooling medium with the exothermic heat of reaction vaporizing the water. The water level within reaction vessel 10 can be adjusted by the inventive control system and the vaporized water withdrawn from reaction vessel 10 by a conduit means not herein illustrated.

As will be evident to those skilled in the art, various modifications of this invention can be made, or followed, in the light of the foregoing disclosure and discussion without departing from the spirit or scope thereof.

I claim:

1. In an exothermic catalytic process which comprises passing a reactant feed downwardly through a vertically fixed catalyst bed contained within an exothermic reactor, and withdrawing from the lower region of said fixed catalyst bed an effluent product; a method of control which comprises measuring a first temperature and a second temperature representative of two vertically spaced temperatures within said fixed catalyst bed with a temperature measuring device, adjusting the vertical position of said temperature measuring device responsive to a temperature differential between said first and second temperature measurements, and adjusting the liquid level of a liquid cooling medium in indirect heat exchange with said fixed catalyst bed responsive to the vertical position having the minimum temperature differential between said first and second temperature measurements so as to maintain said liquid level continuously at the hot zone of said fixed catalyst bed.

2. Apparatus comprising a vessel, a vertical reaction chamber containing a fixed catalyst bed and positioned within said vessel, first conduit means communicating with said reaction chamber, second conduit means communicating with said reaction chamber, third conduit means communicating with said vessel, fourth conduit means communicating with said vessel, a thermocouple having two spaced junctions, each of said spaced junctions in communication with the outside surface of said vertical reaction chamber, said thermocouple capable of measuring a first temperature and a second temperature representative of two vertically spaced temperatures within said fixed catalyst bed, means for moving said thermocouple vertically along and in constant communication with said reaction chamber responsive to a temperature differential between said temperature measurements, and control means for adjusting the rate of fluid flow through said third and fourth conduit means responsive to the position of said thermocouple whereat said temperature differential is a minimum.

3. The apparatus of claim 2 wherein said control means for adjusting the rate of fluid flow through said third and fourth conduit means comprises liquid level sensing means for measuring the liquid level within said vessel, a controller, means for forming and transmitting a first signal representative of said liquid level measurement to said controller, means for forming and for transmitting a second signal representative of the vertical position of said thermocouple to said controller, a first valve means for adjusting the rate of flow of fluid through said third conduit means, means for forming and for transmitting a third signal responsive to said liquid level measurement and said vertical position of said thermocouple from said controller to said first valve means, thereby adjusting the rate of fluid flow through said third conduit means responsive to said third signal, a second valve means for adjusting the rate of flow of fluid through said fourth conduit means, and means for forming and for transmitting said third signal from said controller to said second valve means, whereby adjusting the rate of fluid flow through said fourth conduit means responsive to said third signal.

4. The apparatus of claim 2 wherein said control means for adjusting the rate of fluid flow through said third conduit means and said fourth conduit means comprises a liquid level sensing means attached to said thermocouple, means for forming and for transmitting a signal responsive to the vertical position of said liquid level sensing means and the liquid level within said vessel to a first valve means and a second valve means for adjusting the rate of fluid flow through said third and fourth conduit means, respectively.

References Cited by the Examiner
UNITED STATES PATENTS

| 2,303,075 | 11/42 | Frey | 260—683.9 |
| 2,303,118 | 11/42 | Frey | 260—683.9 |
| 2,332,572 | 10/43 | Hepp et al. | 260—683.9 |
| 2,515,279 | 7/50 | Van Der Hoeven | 260—683.9 |

ALPHONSO D. SULLIVAN, *Primary Examiner.*